United States Patent
Cheng et al.

(10) Patent No.: US 10,908,964 B2
(45) Date of Patent: Feb. 2, 2021

(54) MANAGING PROCESSING SYSTEM EFFICIENCY

(71) Applicant: Google LLC, Mountain View, CA (US)

(72) Inventors: Liqun Cheng, Foster City, CA (US); Rama Krishna Govindaraju, San Jose, CA (US); Haishan Zhu, Austin, TX (US); David Lo, Palo Alto, CA (US); Parthasarathy Ranganathan, San Jose, CA (US); Nishant Patil, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 142 days.

(21) Appl. No.: 16/198,583

(22) Filed: Nov. 21, 2018

(65) Prior Publication Data

US 2019/0155658 A1     May 23, 2019

Related U.S. Application Data (60) Provisional application No. 62/589,535, filed on Nov. 21, 2017.

(51) Int. Cl.
*G06F 9/50* (2006.01)
*G06F 9/48* (2006.01)
*G06N 20/00* (2019.01)

(52) U.S. Cl.
CPC .......... *G06F 9/5038* (2013.01); *G06F 9/4881* (2013.01); *G06F 9/505* (2013.01);
(Continued)

(58) Field of Classification Search
CPC .................................................. G06F 9/5038
See application file for complete search history.

(56) References Cited

U.S. PATENT DOCUMENTS 9,513,974 B2 * 12/2016 Ito .............................. G06F 9/52
2013/0117521 A1    5/2013 Li et al.
(Continued)

OTHER PUBLICATIONS

'aws.amazon com' [online] "Amazon EC2 Pricing," Available on or before Nov. 2016, [retrieved on Dec. 26, 2018] Retrieved from Internet: URL< https://aws.amazon.com/ec2/pricing/on-demand/> 21 pages.
(Continued)

*Primary Examiner* — Charlie Sun
(74) *Attorney, Agent, or Firm* — Fish & Richardson P.C.

(57) ABSTRACT

Methods, systems, and computer storage media storing instructions for managing processing system efficiency. One of the methods includes obtaining data splitting a plurality of general-purpose processing units in a processing system into a high-priority domain and a low-priority domain, wherein the general-purpose processing units in the high-priority domain are assigned to perform one or more tasks comprising one or more high-priority tasks, and the general-purpose processing units in the low-priority domain are assigned to perform one or more low-priority tasks; and during runtime of the processing system, obtaining memory usage measurements that characterize usage of system memory by the high-priority domain and the low-priority domain; and adjusting, based on the memory usage measurements, a configuration of (i) the high-priority domain, (ii) the low-priority domain, or (iii) both to adjust utilization of the system memory by the general-purpose processing units.

30 Claims, 3 Drawing Sheets

(52) U.S. Cl.
CPC .......... *G06F 9/5016* (2013.01); *G06F 9/5061* (2013.01); *G06F 9/5083* (2013.01); *G06N 20/00* (2019.01)

(56) References Cited

U.S. PATENT DOCUMENTS

| | | | | |
|---|---|---|---|---|
| 2014/0068621 | A1* | 3/2014 | Sitaraman | G06F 9/505 718/102 |
| 2015/0067691 | A1 | 3/2015 | Johnson et al. | |
| 2015/0293776 | A1 | 10/2015 | Persson et al. | |
| 2016/0103715 | A1 | 4/2016 | Sethja Ankit et al. | |

OTHER PUBLICATIONS

'cloud.google.com' [online] "Google Cloud Platform Pricing Calculator," Available on or before Sep. 5, 2015, Last updated on Dec. 19, 2018, [retrieved on Dec. 26, 2018] Retrieved from Internet: URL< https://cloud.google.com/products/calculatod> 2 pages.
'Github.com' [online] "TensorFlow — Slim," S Guadarrama, Nov. 2016, [retrieved on Dec. 26, 2018] Retrieved from Internet: URL<https://github.com/tensorflow/tensorflow/tree/master/tensorflow/contrib/slim> 13 pages.
'investors.cray.com' [online] "Cray Introduces Next-Generation Supercomputers," Nov. 6, 2007, [retrieved on Dec. 26, 2018] Retrieved from Internet: URL<http://investors.cray.com/phoenix.zhtml?c=98390&p=irol-newsArticle&ID=1073071 > 5 pages.
'Mahoutapache.org' [online] "Mahout," Dec. 2017, [retrieved on Dec. 20, 2018] Retrieved from Internet: URL< http://mahout.apache.org/> 2 pages.
'software.intel.com' [online] "Disclosure of H/W prefetcher control on some Intel processors," Vish Viswanathan Published Sep. 24, 2014, [retrieved on Dec. 26, 2018] Retrieved from Internet: URL<https://software.intel.com/en-us/articles/disclosure-of-hw-prefetcher-control-on-some-intel-processors> 5 pages.
'software.intel.com' [online] "Intel Xeon Processor E5-2600 V4 Product Family Technical Overview," David Mulnix, published Apr. 19, 2016, [retrieved on Dec. 26, 2018] Retrieved from Internet: URL< https://software.intel.com/en-us/articles/intel-xeon-processor-e5-2600-v4-product-family-technical-overview> 26 pages.
'software.intel.com' [online] Intel Xeon Processor Scalable Family Technical Overview, David Mulnix, published Jul. 10, 2017, last updated on Sep. 14, 2017, [retrieved on Dec. 26, 2018] Retrieved from Internet: URL<https://software.intel.com/en-us/articles/intel-xeon-processor-scalable-family-technical-overview> 38 pages.
'www.blog.goole' [online] "Build and Train Machine Learning Models on Our New Google Cloud TPUs," Jeffrey Dean, May 17, 2017, [retrieved on Dec. 20, 2018] Retrieved from Internet: URL< https://www.blog.google/products/google-cloud/google-cloud-offer-tpus-machine-learning/> 9 pages.
'www.intel.com' [online] "An Introduction to the Intel QuickPath Interconnect," Jan. 2009, [retrieved on Dec. 26, 2018] Retrieved from Internet: URL< https://www.intel.com/content/dam/doc/white-paper/quick-path-interconnect-introduction-paper.pdf> 22 pages.
'www.intel.com' [online] "Intel Xeon Processor Scalable Family Datasheet, vol. 1: Electrical," Jul. 2017, Last updated May 2018, [retrieved on Dec. 26, 2018] Retrieved from Internet: URL<https://www.intel.com/content/www/us/en/processors/xeon/scalable/xeon-scalable-datasheet-vol-1.html> 132 pages.
'www.microsoft.com' [online] "Microsoft unveils Project Brainwave for real-time AI," Aug. 22, 2017, [retrieved on Dec. 20, 2018] Retrieved from Internet: URL< https://www.microsoft.com/en-us/research/blog/microsoft-unveils-project-brainwave/> 5 pages.
'www.tensorflow.org' [online] "Distributed TensorFlow," Aug. 2017, [retrieved on Dec. 26, 2018] Retrieved from Internet: URL<https://www.tensorflow.org/deploy/distributed> 9 pages.
'www.tensorflow.org' [online] "Performance," Aug. 2017, [retrieved on Dec. 26, 2018] Retrieved from Internet: URL< https://www.tensorflow.org/guide/performance/overview> 10 pages.
'www.top500.org' [online] "Tianhe-2 Supercomputer Being Upgraded to 95 Petaflops," Michael Feldman, Sep. 20, 2017, [retrieved on Dec. 26, 2018] Retrieved from Internet: URL<https://www.top500.org/news/tianhe-2-supercomputer-being-upgraded-to-95-petaflops/> 10 pages.
'www.xilinx.com' [online] "Baidu Deploys Xilinx FPGAs in New Public Cloud Acceleration Services," Jul. 4, 2017, [retrieved on Dec. 26, 2018] Retrieved from Internet: URL<https://www.xilinx.com/news/press/2017/baidu-deploys-xilinx-fpgas-in-new-public-cloud-acceleration-services.html> 2 pages.
Abadi et al. "TensorFlow: Large-scale machine learning on heterogeneous distributed systems," arXiv 1603.04467v2, Mar. 16, 2016, 19 pages.
Albericio et al. "Cnvlutin: ineffectual-neuron-free deep neural network computing," ACM/IEEE $43^{rd}$ Annual International Symposium on Computer Architecture, Jun. 18, 2016, 13 pages.
Canziani et al. "An analysis of deep neural network models for practival applications," arXiv 1605.07678v4, Apr. 14, 2017, 7 pages.
Chen et al. "Baymax: QoS Awareness and Increased Utilization for Non-Preemptive Accelerators in Warehouse Scale Computers," Proceedings of the Twenty-first International Conference on Architectural Support for Programming Languages and Operating Systems, Jul. 2016, 16 pages.
Chen et al. "DaDianNao: A Machine Learning supercomputer," Proceedings of the $47^{th}$ Annual IEEE/ACM International Symposium on Microarchitecture, Dec. 13, 2014, 14 pages.
Chen et al. "DianNao: A small-footprint high-throughput accelerator for ubiquitous machine learning," ACM Sigplan Notices, Apr. 2014, 15 pages.
Chen et al. "Eyeriss: A spatial architecture for energy-efficient dataflow for convolutional neural networks," ACM/IEEE $43^{rd}$ Annual International Symposium on Computer Architecture, Jun. 18, 2016, 13 pages.
Chen et al. "Prophet: Precise QoS Prediction on Non-Preemptive Accelerators to Improve Utilization in Warehouse-Scale Computers," Proceedings of the Twenty-Second International Conference on Architectural Support for Programming Languages and Operating Systems, May 2017, 16 pages.
Collobert et al. "Torch7: A matlab-like environment for machine," BigLearn, NIPS Workshop, 2011, No. EPFL-CONF-192376, Dec. 2011, 6 pages.
Dean et al. "Large scale distributed deep networks," Proceedings of the $25^{th}$ International Conference on Neural Information Processing Systems—vol. 1, Dec. 2012, 9 pages.
Dean et al. "The tail at scale," Communications of the ACM, Feb. 1, 2013, 7 pages.
Ebrahimi et al. "Perfect-aware shared resource management for multi-core systems," ACM Sigarch Computer Architecture News, Jun. 4, 2011, 12 pages.
Farabet et al. "Cnp: An fpga-based processor for convolutional networks," International Conference on Field Programmable Logic and Applications, Aug. 31, 2009, 6 pages.
Farabet et al. "Large-scale FPGA-based convolutional networks," Scaling up Machine Learning: Parallel and Distributed Approaches, May 2, 2011, 26 pages.
Han et al. "EIE: efficient inference engine on compressed deep neural network," Proceedings of the $43^{rd}$ International Symposium on Computer Architecture, Jun. 18, 2016, 12 pages.
Han et al. "Learning both weights and connections for efficient neural networks," NIPS, Dec. 2015, 9 pages.
Hinton et al. "Deep neural networks for acoustic modeling in speech recognition: the shared views of four research groups," IEEE Signal Processing Magazine, Nov. 2012, 16 pages.
Hsu et al. "Adrenaline: Pinpointing and reining in tail queries with quick voltage boosting," IEEE $21^{st}$ International Symposium on High Performance Computer Architecture, Feb. 7, 2015, 12 pages.
Iyer et al "CQoS: a framework for enabling QoS in shared caches of cmp platforms," Proceedings of the $18^{th}$ annual International Conference on Supercomputing, ACM, Jun. 26, 2004, 10 pages.
Iyer et al. "QoS policies and architecture for cache/memory in cmp platforms," ACM Sigmetrics Performance Evaluation Review, Jun. 12, 2007, 12 pages.

(56) References Cited

OTHER PUBLICATIONS

Jeong et al. "A QoS-aware memory controller for dynamically balancing gpu and cpu bandwidth use in an mpsoc," Proceedings of the 49th Annual Design Automation Conference, Jun. 3, 2012, 6 pages.
Jia et al. "Caffe: Convolutional Architecture for fast feature embedding," Proceedings of the 22nd ACM International Confernece on Multimedia, Nov. 2014, arXiv 1408.5093v1, 4 pages.
Jouppi et al. "In-datacenter performance analysis of a tensor processing unit," arXiv 1704.04760, Apr. 16, 2017, 17 pages.
Kambadur et al. "Measuring interference between live datacenter applications," Proceedings of the International Conference on High Performance Computing, Networking, Storage and Analysis, Nov. 10, 2012, 12 pages.
Kanel et al. "Profiling a warehouse-scale computer," ACM/IEEE 42nd Annual International Symposium on Computer Architecture, Jun. 13, 2015, 12 pages.
Kasture et al. "Ubik: efficient cache sharing with strict qos for latency-critical workloads," ACM Sigarch Computer Architecture News, Feb. 24, 2014, 15 pages.
Khazraee et al. "Moonwalk: Nre optimization in ASIC clouds," Proceedings of the Twenty-Second International Conference on Architectural Support for Programming Languages and Operating Systems, Jul. 26, 2017, 16 pages.
Koehn et al. "Statistical Phrase-based translation," Proceedings of the 2003 Conference of the North American Chapter of the Association for Computational Linguistics on Human Language Technology—vol. 1, May 27, 2003, 7 pages.
Krizhevsky et al. "Imagenet classification with deep convolutional neural networks," NIPS Dec. 2012, 9 pages.
Leverich et al. "Reconciling high server utilization and sub-millisecond quality-of-service," Proceedings of the Ninth European Conference on Computer Systems, Apr. 14, 2014, 14 pages.
Lo et al. "Heracles: Improving Resource Efficiency at Scale," Proceedings of the 42nd Annual International Symposium on Computer Architecture, Jun. 2015, 13 pages.
Magaki et al. "ASIC clouds: specializing the datacenter," Proceedings of the 43rd International Symposium on Computer Architecture, Jun. 18, 2016, 13 pages.
Mars et al. "Bubble-up: Increasing utilization in modern warehouse scale computers via sensible co-locations," Proceedings of the 44th annual IEEE/ACM International Symposium on Microarchitecture, Dec. 3, 2011, 12 pages.
Muralidhara et al. "Reducing memory interference in multicore systems via application-aware memory channel partitioning," Proceedings of the 44th Annual IEEE/ACM International Symposium on Microarchitecture, Dec. 3, 2011, 12 pages.
Ovtcharov et al. "Accelerating deep convolutional neural networks using specialized hardware," Microsoft Research Whitepaper, Feb. 22, 2015, 4 pages.
Ovtcharov et al. "Toward accelerating deep learning at scale using specialized hardware in the datacenter," IEEE Hot Chips27 Symposium, presentation, Aug. 22, 2015, [retrieved on Jan. 10, 2018]
Retrieved from Internet:URL<https://www.microsoft.com/en-us/research/wp-content/uploads/2014/06/HC27.25.432-Catapult_HOTCHIPS2015_Chung_DRAFT_V8.pdf> 38 pages.
Putnam et al. "A reconfigurable fabric for accelerating large-scale datacenter services," ACM/IEEE 41st International Symposium on Computer Architecture, Oct. 2014, 12 pages.
Shen et al. "Maximizing cnn accelerator efficiency through resource partitioning," arXiv 1607.00064v2, Apr. 12, 2018, 13 pages.
Srinath et al. "Feedback directed prefetching: improving the performance and bandwidth-efficiency of hardware prefetchers," IEEE 13th International Symposium on High Performance Computer Architecture, Feb. 10, 2007, 12 pages.
Sutskever et al. "Sequence to sequence learning with neural networks," NIPS, Dec. 2014, 9 pages.
Szegedy et al. "Going deeper with convolutions," Proceedings of the IEEE Conference on Computer Vision and Patter Recognition, Jun. 2015, 9 pages.
Szegedy et al. "Inveption-v4 inception-resnet and the impact of residual connections on learning," AAAI, Feb. 2017, 7 pages.
Usui et al. "SQUASH: Simple QoS-aware high-performance memory scheduler for heterogeneous systems with hardware accelerators," arXiv 1505.07502, May 27, 2015, 20 pages.
Verma et al. "Large-scale cluster management at google with borg," Proceedings of the Tenth European Conference on Computer Systems, Apr. 17, 2015, 17 pages.
Yang et al. "Bubble-flux: Precise online qos management for increased utilization in warehouse scale computers," ACM Sigarch Computer Architecture News, Jun. 23, 2013, 12 pages.
Yun et al. "Memguard: Memory bandwidth reservation system for efficient performance isolation in multi-core platforms," Real-Time and embedded Technology and Applications Symposium Apr. 9, 2013, 10 pages.
Zhang et al. "Cpi2: Cpu performance isolation for shared compute clusters," Proceedings of the 8th ACM European Conference on Computer Systems, Apr. 15, 2013, 13 pages.
Zhang et al. "Optimizing fpga-based accelerator design for deep convolutional neural networks," Proceedings of the 2015 ACM. SIGDA International Symposium on Field-Programmable Gate Arrays, Feb. 22, 2015, 10 pages.
Zhou et al. "Mitts: Memory Inter-arrival time traffic shaping," Proceedings of the 43rd International Symposium on Computer Architecture, Jun. 18, 2016, 13 pages.
Zhu et al. "Dirigent: Enforcing QoS for latency-critical tasks on shared multicore systems," Proceedings of the Twenty-First International Conference on Architectural Support for Programming Languages and Operating Systems, Jul. 29, 2016, 15 pages.
PCT International Search Report and Written Opinion issued in International Application No. PCT/US2018/062111, dated Feb. 28, 2019, 19 pages.
PCT International Preliminary Report in International Application No. PCT/US2018/06211, dated Jun. 4, 2020, 13 pages.

* cited by examiner

MANAGING PROCESSING SYSTEM EFFICIENCY

CROSS-REFERENCE TO RELATED APPLICATIONS

This application claims the benefit under 35 U.S.C. § 119(e) of the filing date of U.S. Patent Application No. 62/589,535, entitled "Managing Processing System Efficiency," which was filed on Nov. 21, 2017, and which is incorporated here by reference.

BACKGROUND

This specification relates to improving accelerated resource-intensive computation efficiency.

Hardware accelerators, such as Graphical Processing Units (GPUs) or Tensor Processing Units (TPUs), have much greater computational capacity compared to general-purpose processors, e.g., traditional Central Processing Units (CPUs). As a result, accelerators have started to drive much of the improvement in performance for critical workloads. For example, accelerators are widely used for machine learning training and inference tasks.

SUMMARY

This specification describes a system implemented as computer programs on or more computers in one or more locations that manages the efficiency of a processing system that includes multiple general-purpose processing units.

The system splits a plurality of general-purpose processing units, e.g., CPU cores, into high-priority and low-priority domains. The general-purpose processing units in the high-priority domain are assigned to perform one or more tasks including one or more high-priority tasks, and the general processing units in the low-priority domain are assigned to perform one or more tasks including one or more low-priority tasks. Generally, the processing units in the low-priority domain are not assigned to perform any high-priority tasks. Moreover, the processing system generally also includes one or more hardware accelerators that are assigned a resource-intensive workload, e.g., a machine learning workload, and the high-priority tasks are tasks that are associated with that resource-intensive workload, i.e., tasks that support the workload assigned to the hardware accelerators.

During runtime of the processing system, the system obtains memory usage measurements that characterize usage of system memory by the high-priority domain and the low-priority domain. Based on the memory usage measurements, the system adjusts a configuration of (i) the high-priority domain, (ii) the low-priority domain, or (iii) both to adjust utilization of the system memory by the general-purpose processing units.

The system can repeatedly obtain the usage measurements and adjust the configurations during runtime to increase the efficiency of the processing system.

Particular embodiments of the subject matter described in this specification can be implemented so as to realize one or more of the following advantages. While hardware accelerators are responsible for the most heavily computational tasks in resource-intensive computation, general purpose processors, e.g., CPUs, often perform various supporting roles. For example, in a large-scale distributed machine learning system, CPUs may perform the supporting role of collecting and synchronizing machine learning model parameters. The supporting role of CPUs, however, may degrade system performance efficiency by competing with accelerators for shared resources, such as system memory. The described technology splits a plurality of general-purpose processing units into high-priority and low-priority domains, memory requests within each subdomain are handled by the corresponding memory controller and enjoy both lower memory latency and cache latency. Moreover, by filling the high-priority domain with low-priority CPU tasks, lost throughput due to fragmentation in domain-partitioning can be regained. Furthermore, by comparing measurements from performance counters during runtime, the system can choose to boost, throttle, or keep the resource configuration to reduce resource contention within and between high-priority and low-priority domains.

The details of one or more embodiments of the subject matter of this specification are set forth in the accompanying drawing and description below. Other features, aspects, and advantages of the subject matter will become apparent from the description, the drawings, and the claims.

BRIEF DESCRIPTION OF THE DRAWINGS

Specific embodiments of the invention will now be described in detail with reference to the accompanying figures. Like elements in the various figures are denoted by like reference numerals for consistency.

DETAILED DESCRIPTION

Figure 1:
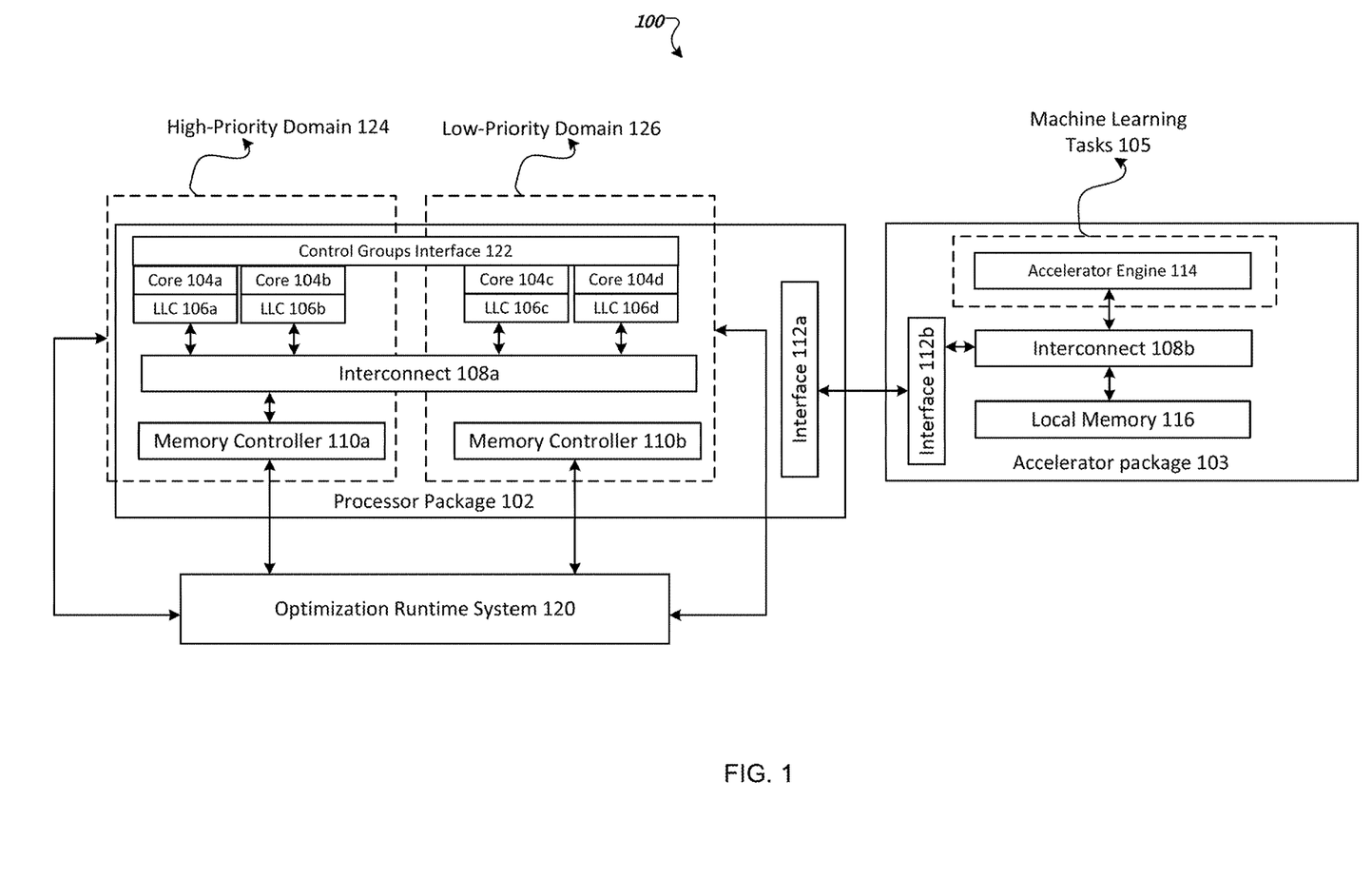
FIG. 1 is a diagram of an example processing system designed to manage resource-intensive computation.

FIG. 1 is a diagram of an example system 100 that manages resource-intensive computation. The system 100 includes an accelerator package 103 designed to handle high-priority workloads such as machine learning tasks, and a processor package 102 designed to handle low-priority workloads such as CPU tasks. For example, a CPU task includes collecting the shared gradients from multiple accelerator packages. The accelerator package 103 is communicably coupled to the processor package 102 using one or more interfaces 112a and 112b. An optimization runtime system 120 manages the processor package 102 to improve its computation efficiency. For example, the optimization runtime system 120 is a set of computer programs running on a computer system including the processor package 102 and the accelerator package 103.

The accelerator package 103 includes an accelerator engine 114 that performs the intensive computation associated with high-priority workloads. For example, the accelerator engine 114 can be a TPU or a GPU and the computation in the high-priority workload involves the training of a deep neural network, e.g., to repeatedly compute gradients of an objective function being used to train the neural network, or performing inference using the deep neural network, i.e., generating outputs using the deep neural network after the neural network has been trained.

The processor package 102 includes 102 includes cores 104a-104d responsible for performing computations, last-level-caches (LLCs) 106a-106d that store data for the computations, an interconnect 108a that connects different processing cores and LLCs, and memory controllers 110a-110b. While the processor package 102 mostly handles low-priority workloads, part of the computation from the high-priority workloads, e.g., memory-intensive computations, still runs on the processor package 102. For example, the processor package 102 can play a supportive role of acting as a parameter server during the training of the neural network. As a parameter server, the processor package 102 during a machine learning task can collect shared gradients from multiple accelerator packages, can aggregate computed gradients, can update the parameters in real-time using the gradients, and then provide the updated parameter values to the accelerator packages. In another example, the processor packages 102 can perform an in-feed operation, in which the processor package interprets and reshapes input data before sending the data to the accelerator package 103. In another example, the processor package 102 can handle irregular and complex supporting tasks such as beam search in machine translation applications.

As a result, in practice, the processor package 102 handles both low-priority tasks and certain parts of high-priority tasks. The low-priority tasks can interfere with the high-priority tasks by contending for shared resources such as in-pipeline resources, private caches shared through simultaneous multi-threading, last-level cache, and main memory bandwidth. To reduce performance bottlenecks, the optimization runtime system 120 splits the processor package 102 into a low-priority domain 126 and a high-priority domain 124.

Each domain has its dedicated processing units, memory, and memory controllers. For example, the high-priority domain 124 includes dedicated cores 104a and 104b, dedicated LLCs 106a and 106b, and a dedicated memory controller 110a. The low-priority domain 125 includes dedicated cores 104c and 104d, dedicated LLCs 106c and 106d, and a dedicated memory controller 110b. For example, the optimization runtime system 120 can use Non-uniform memory access (NUMA) subdomain performance isolation technique to split the processor package 102. As a result, the processor package 102 is exposed to an operating system running in a computer unit including the system 100 as two NUMA domains, e.g., the high-priority domain 124 and the low-priority domain 126. Example techniques to implement NUMA subdomain performance isolation include sub-NUMA Clustering (SNC), Cluster-on-Die (CoD), and so on. A control groups interface 122 monitors, controls, and manages different groups of processes and their resource usages in the subdomains. Memory controllers 110a and 110b handle memory requests within each NUMA subdomain respectively. As a result, local memory requests experience both lower LLC and memory latency.

In some implementations, although the high-priority domain 124 has been isolated from the low-priority domain 126, low-priority tasks can still interfere with the high-priority tasks due to a phenomenon called shared memory backpressure. Shared memory backpressure occurs when low-priority tasks in the low-priority domain 126 generate a large amount of memory traffic and saturate the corresponding memory controller 110b's bandwidth. In response, the memory controller 110b broadcasts a distress signal to all the cores 104a-104d across the processor package. When the cores 104a-104d receive the distress signal from the memory controller 110b, they become throttled in order to avoid congesting the interconnect 108a. This mechanism is detrimental to the domain-splitting technique described above as each subdomain, e.g., the low-priority subdomain and the high-priority subdomain, already routes memory traffic internally. The memory saturation in the low-priority domain 126 itself has only minimal impact on the memory use in the high-priority domain 124, but the shared memory backpressure causes the cores 104a-104b in the high-priority domain 124 to be throttled nevertheless. As a result, the shared memory backpressure reduces the effectiveness of the memory interference protection implemented by the domain-splitting technique.

In some implementations, to reduce the effect of shared memory backpressure, the optimization runtime system 120 repeatedly measures the level of memory saturation in the low-priority domain 126, the high-priority domain 124, and/or the processor package 102 and, when appropriate, performs some actions to reduce the undesirable effects.

For example, the optimization runtime system 120 can use existing hardware performance monitoring infrastructure such as measurements from the performance event FAST_ASSERTED from the Intel Uncore LLC coherence engine. This performance event reports the number of cycles in which the distress signal is asserted. The optimization runtime system 120 can quantify the memory saturation by dividing this cycle number by the number of total elapsed cycles between two measurements. The optimization runtime system 120 then disables cache prefetching for low-priority tasks in the low-priority domain 126 to reduce memory traffic. This disabling causes performance loss of low-priority tasks, but maintain performance in the high-priority domain 124.

In some implementations, the optimization runtime system 120 backfills the high-priority domain 124 with low-priority tasks to improve system throughput. For example, the optimization runtime system 120 can be scheduled to run with the node-level scheduler runtime to gather necessary task information such as job priority and profile in both the high-priority domain 124 and the low-priority domain 126. The optimization runtime system 120 assigns both high-priority tasks and low-priority tasks to designated domains, with low-priority tasks prioritized to be assigned to the low-priority domain 126 and high-priority tasks exclusively assigned to the high-priority domain 124.

Figure 3:
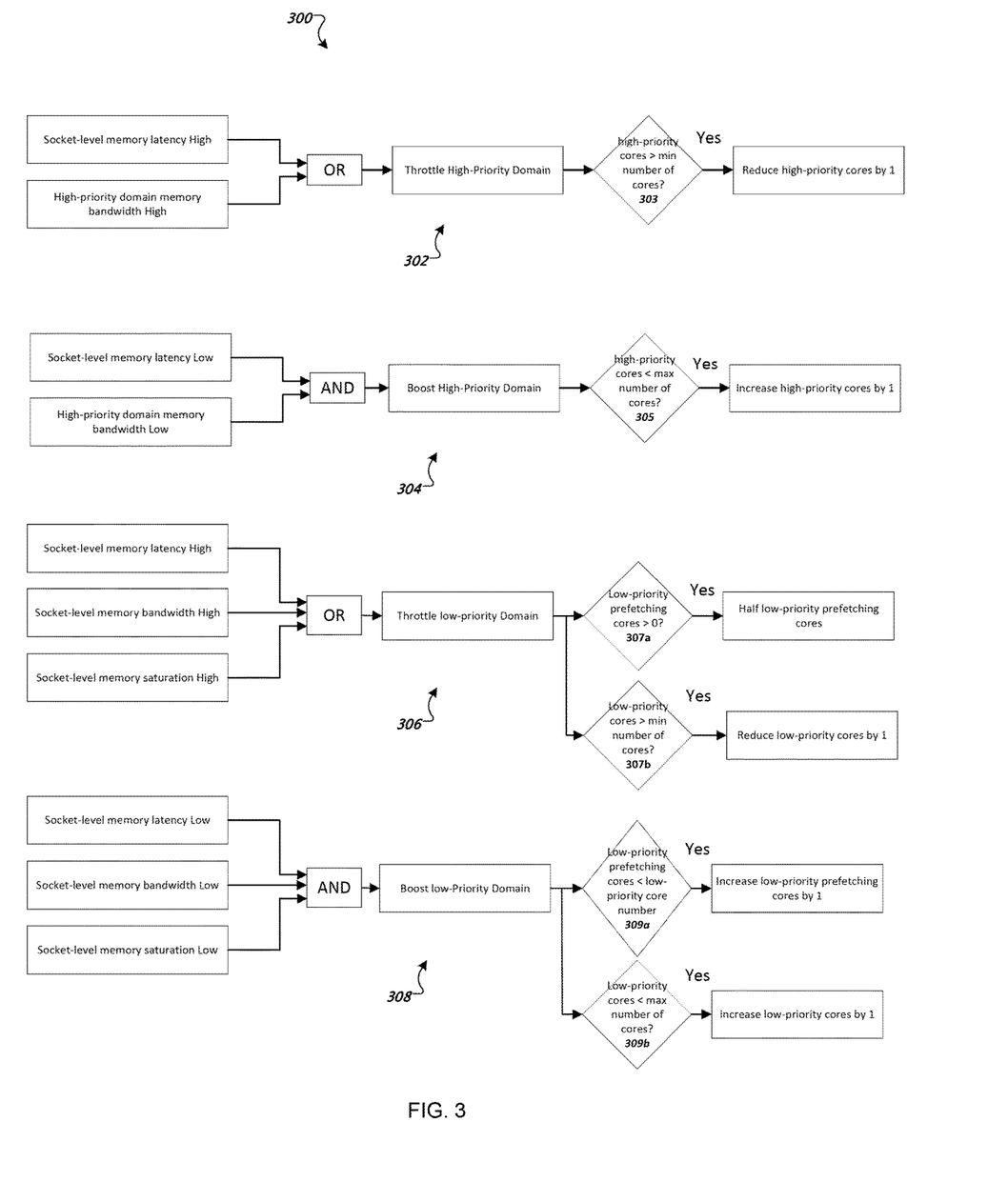
FIG. 3 is a flowchart of an example software logic for configuring resources on multiple processing units.

When a task is first scheduled on the processor package 102, the optimization runtime system 120 receives high and low watermarks for each measurement of the task. The optimization runtime system 120 makes different measurements at specified time intervals, including:

1. Socket-level memory bandwidth
2. Socket-level memory latency
3. Socket-level memory saturation
4. High-priority domain memory bandwidth Where "socket-level" indicates that the measurements are taken across the entire processor package 102. By comparing the measurements with the watermarks specified in the task profile, the optimization runtime system 120 can choose to boost, throttle, or keep the resource configuration for low-priority tasks in each domain. FIG. 3 and the related descriptions explain in detail the node-level resource management logic used by the optimization runtime system 120.

In summary, the optimization runtime system 120 operates when the processor package 102 are assigned both high-priority tasks and low-priority tasks. The optimization runtime system 120 improves the performance of the processor package 102 by redistributing computing resources between the high-priority tasks and the low-priority tasks. As a result, the high-priority tasks are isolated from interference by the low-priority tasks, e.g., such as memory interference.

Figure 2:
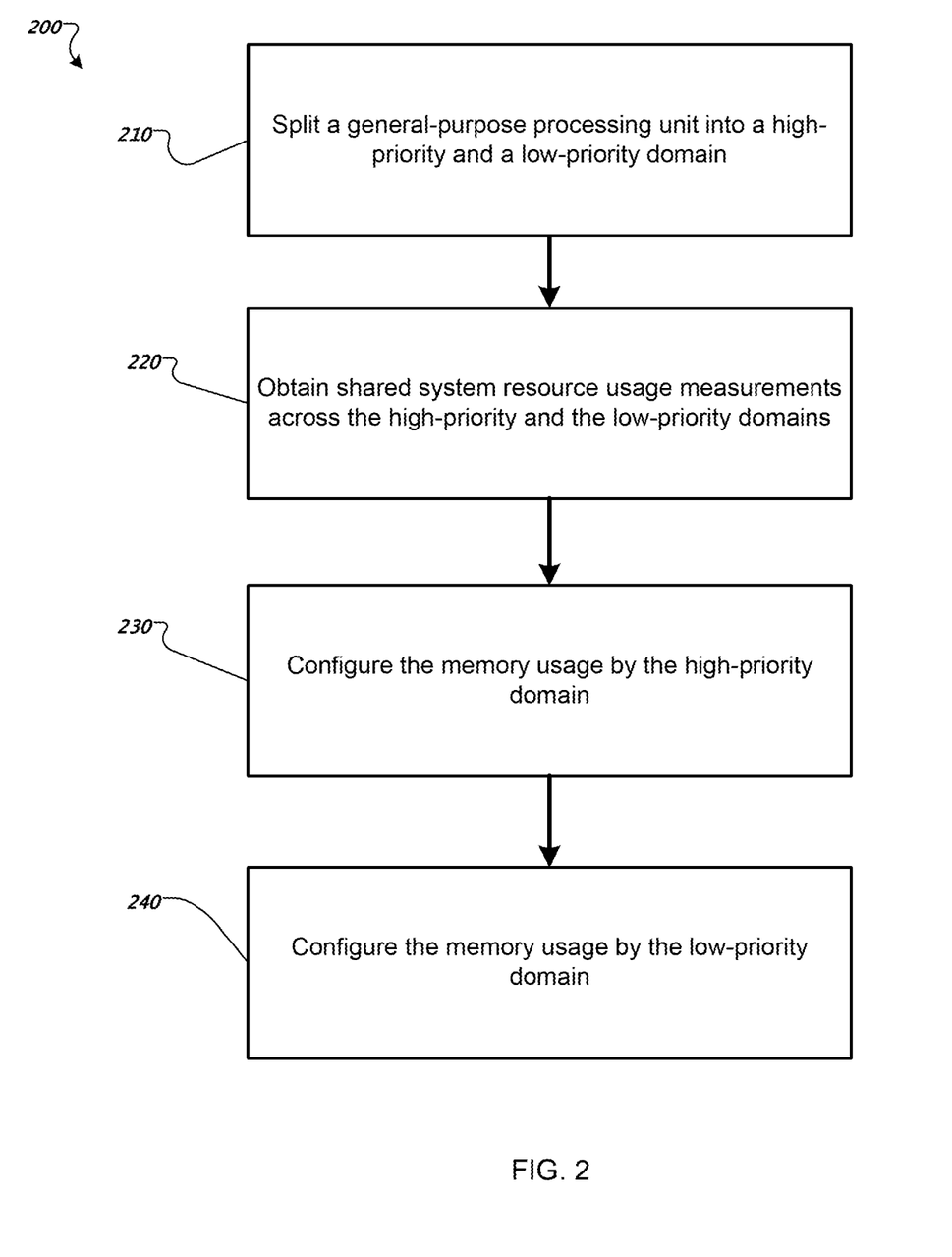
FIG. 2 is a flowchart of an example process for managing resources on multiple processing units.

FIG. 2 is a flowchart of an example process 200 for managing resources on multiple processing units. For convenience, the process 200 will be described as being performed by a system, e.g., the optimization runtime system 120 of in FIG. 1.

The system can perform the process 200 to configure resources on multiple processing units, e.g., the processor package 102, to improve performance for both high-priority and low-priority tasks.

As the first step, the system splits the multiple processing units into a high-priority domain and a low-priority domain (210). As described in FIG. 1, the system assigns both high-priority tasks and low-priority tasks to the high-priority domain, and assigns only low-priority tasks to the low-priority domain. Low-priority tasks are prioritized to be assigned to the low-priority domain. Example high-priority tasks include machine learning tasks, and example low-priority tasks include CPU tasks.

The system then obtains shared system resource usage measurements across the high-priority and the low-priority domains (220). For example, the system can make four types of measurements across the multiple processing units, including (1) socket-level memory bandwidth, (2) socket-level memory latency, (3) socket-level memory saturation, and (4) high-priority domain memory bandwidth. The system can take the measurement at a specified time interval to cause negligible performance overhead, e.g., every 10 seconds.

In some implementations, the system has previously collected a task profile when the task is first loaded onto the multiple processing units. For example, the task profile can include high and low watermarks for each of the above-mentioned measurements.

By comparing the real-time measurement against the high and low watermarks, the system detects potential performance bottlenecks and configures the memory usage by the high-priority domain (230) and by the low priority domain (240). For example, the system can disable or enable cache prefetching for processing cores in the low-priority domain, and can activate or deactivate processing cores in both domains. Configuring the high-priority and low-priority domain is described below with reference to FIG. 3.

The system can repeatedly perform steps 220-240 during the performance of the task to improve overall system performance.

FIG. 3 is a flowchart of an example software logic 300 for configuring resource on multiple processing units. For convenience, the software logic 300 is described as being performed by a system, e.g., the optimization runtime system 120 of FIG. 1.

As described in FIG. 2, after the system compares the real-time measurements against the high and low watermarks of the running tasks, the system can configure resources on the processing unit to reduce performance bottlenecks.

The system measures socket-level memory latency, socket-level memory bandwidth, socket-level memory saturation, and high-priority domain memory bandwidth. By comparing the measurements against the high and low watermarks, the system determines whether the current measurements are "high" or "low." For example, the system can determine that a measured value being greater than 90% of the high watermark to be "high," and being smaller than 10% of the low watermark to be "low." The system configures the resources on the multiple processing units based on the following rules:

1) If either the high-priority domain memory bandwidth or the socket-level memory latency is high, then the system throttles the high-priority domain (302).

2) If both the high-priority domain memory bandwidth and the socket-level memory latency are low, then the system boosts the high-priority domain (304).

3) If any of the three socket-level measurements is high, then the system throttles the low-priority domain (306).

4) If all three socket-level measurements are high, then the system boosts the low-priority domain (308).

To throttle or boost the high-priority domain, the system increases or reduces the number of cores in the high-priority domain, respectively. To throttle or boost the low-priority domain, the system increases or reduces the number of cores in the low-priority domain, respectively, and increase or reduce the number of cores using prefetching in the low-priority domain, respectively.

To throttle the high-priority domain, the system checks if the number of cores operating in the high-priority domain is greater than a minimum number of cores, e.g., as defined in the corresponding task profile (303). If so, the system reduces the number of operating cores in the high-priority domain by one.

To boost the high-priority domain, the system checks if the number of cores operating in the high-priority domain is smaller than a maximum number of cores, e.g., as defined in the corresponding task profile (305). If so, the system increases the number of operating cores in the high-priority domain by one.

To throttle the low-priority domain, the system checks if the number of cores using prefetching in the low-priority domain is greater than zero (307*a*). If so, the system closes half of the prefetching cores in the low-priority domain. Furthermore, if the number of operating cores in the low-priority domain is greater than a minimum number of cores (307*b*), the system reduces the number of operating cores in the low-priority domain by one.

To boost the low-priority domain, the system checks if the number of prefetching cores is smaller than the number of operating cores in the low-priority domain (309*a*). If so, the system increases the number of prefetching cores in the low-priority domain by one. Furthermore, the system checks if the number of operating cores is smaller than the maximum number of cores in the low-priority domain (309*b*). If so, the system increases the number of operating cores in the low-priority domain by one.

The system is more aggressive in disabling prefetching cores (closing half of the cores in throttle mode but only increase one core in boost mode) in order to prioritize high-priority task performance.

This specification uses the term "configured" in connection with systems and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nontransitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or another unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification, the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flow described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of a message to a personal device, e.g., a smartphone that is running a messaging application and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining data splitting a plurality of general-purpose processing units in a processing system into a high-priority domain and a low-priority domain, wherein
   the general-purpose processing units in the high-priority domain are assigned to perform one or more tasks comprising one or more high-priority tasks, and
   the general-purpose processing units in the low-priority domain are assigned to perform one or more low-priority tasks; and
   during runtime of the processing system, obtaining memory usage measurements that characterize usage of system memory by the high-priority domain and the low-priority domain; and
   adjusting, based on the memory usage measurements, a configuration of (i) the high-priority domain, (ii) the low-priority domain, or (iii) both to adjust utilization of the system memory by the general-purpose processing units.

2. The method of claim 1, wherein the processing system further comprises a plurality of special-purpose hardware accelerators assigned to perform an accelerated workload and wherein the high-priority tasks are tasks associated with the accelerated workload.

3. The method of claim 2, wherein the accelerated workload is a machine learning workload.

4. The method of claim 1, wherein the one or more tasks assigned to the high-priority domain further comprise one or more low-priority tasks.

5. The method of claim 1, wherein the memory usage measurements comprise a measurement of system memory bandwidth.

6. The method of claim 5, wherein adjusting, based on the memory usage measurements, a configuration of (i) the high-priority domain, (ii) the low-priority domain, or (iii) both to adjust utilization of the system memory by the general-purpose processing units comprises:
   reducing the number of active general purpose processors in the low-priority domain when the system memory bandwidth is high.

7. The method of claim 5, wherein adjusting, based on the memory usage measurements, a configuration of (i) the high-priority domain, (ii) the low-priority domain, or (iii) both to adjust utilization of the system memory by the general-purpose processing units comprises:
   increasing the number of active general purpose processors in the low-priority domain when the system memory bandwidth is low.

8. The method of claim 1, wherein the memory usage measurements comprise a measurement of system memory latency.

9. The method of claim 8, wherein adjusting, based on the memory usage measurements, a configuration of (i) the high-priority domain, (ii) the low-priority domain, or (iii) both to adjust utilization of the system memory by the general-purpose processing units comprises:
   reducing the number of active general purpose processors in the low-priority domain when the system latency is high.

10. The method of claim 8, wherein adjusting, based on the memory usage measurements, a configuration of (i) the high-priority domain, (ii) the low-priority domain, or (iii) both to adjust utilization of the system memory by the general-purpose processing units comprises:
    increasing the number of active general purpose processors in the low-priority domain when the system memory bandwidth is low.

11. The method of claim 1, wherein the memory usage measurements comprise a measurement of system memory saturation.

12. The method of claim 11, wherein adjusting, based on the memory usage measurements, a configuration of (i) the high-priority domain, (ii) the low-priority domain, or (iii) both to adjust utilization of the system memory by the general-purpose processing units comprises:
reducing the number of active general purpose processors in the low-priority domain when the system memory saturation is high.

13. The method of claim 11, wherein adjusting, based on the memory usage measurements, a configuration of (i) the high-priority domain, (ii) the low-priority domain, or (iii) both to adjust utilization of the system memory by the general-purpose processing units comprises:
increasing the number of active general purpose processors in the low-priority domain when the system memory saturation is low.

14. The method of claim 1, wherein the memory usage measurements comprise a measurement of high-priority domain memory bandwidth.

15. The method of claim 14, wherein adjusting, based on the memory usage measurements, a configuration of (i) the high-priority domain, (ii) the low-priority domain, or (iii) both to adjust utilization of the system memory by the general-purpose processing units comprises:
reducing the number of active general purpose processors in the high-priority domain when the high-priority domain memory bandwidth is high.

16. The method of claim 14, wherein adjusting, based on the memory usage measurements, a configuration of (i) the high-priority domain, (ii) the low-priority domain, or (iii) both to adjust utilization of the system memory by the general-purpose processing units comprises:
increasing the number of active general purpose processors in the high-priority domain when the high-priority domain memory bandwidth is low.

17. The method of claim 1, wherein the adjusting comprises:
reducing the number of active general purpose processors in the low-priority domain when measurements of system memory bandwidth, system memory latency, or system memory saturation are high, and
increasing the number of active general purpose processors in the low-priority domain when the measurements of system memory bandwidth, system memory latency, and system memory saturation are low.

18. The method of claim 1, wherein the adjusting comprises:
reducing the number of general purpose processors utilizing cache prefetching in the low-priority domain when the measurements of system memory bandwidth, system memory latency, or system memory saturation are high, and
increasing the number of general purpose processors utilizing cache prefetching in the low-priority domain when the measurements of system memory bandwidth, system memory latency, and the system memory saturation are low.

19. The method of claim 1, wherein the adjusting comprises:
reducing the number of active general purpose processors in the high-priority domain when the measurements of high-priority domain memory bandwidth or system memory latency are high, and
increasing the number of active general purpose processors in the high-priority domain when high-priority domain memory bandwidth and system memory latency are low.

20. A system comprising:
one or more computers; and
one or more storage devices storing instructions that when executed by the one or more computers cause the one or more computers to perform operations comprising:
obtaining data splitting a plurality of general-purpose processing units in a processing system into a high-priority domain and a low-priority domain
the general-purpose processing units in the high-priority domain are assigned to perform one or more tasks comprising one or more high-priority tasks, and
the general-purpose processing units in the low-priority domain are assigned to perform one or more low-priority tasks; and
during runtime of the processing system, obtaining memory usage measurements that characterize usage of system memory by the high-priority domain and the low-priority domain; and
adjusting, based on the memory usage measurements, a configuration of (i) the high-priority domain, (ii) the low-priority domain, or (iii) both to adjust utilization of the system memory by the general-purpose processing units.

21. The system of claim 20, wherein the processing system further comprises a plurality of special-purpose hardware accelerators assigned to perform an accelerated workload and wherein the high-priority tasks are tasks associated with the accelerated workload.

22. The system of claim 21, wherein the accelerated workload is a machine learning workload.

23. The system of claim 20, wherein the one or more tasks assigned to the high-priority domain further comprise one or more low-priority tasks.

24. The system of claim 20, wherein the memory usage measurements comprise a measurement of system memory bandwidth.

25. One or more non-transitory computer storage media storing instructions that when executed by one or more computers cause the one or more computers to perform operations comprising:
obtaining data splitting a plurality of general-purpose processing units in a processing system into a high-priority domain and a low-priority domain, wherein
the general-purpose processing units in the high-priority domain are assigned to perform one or more tasks comprising one or more high-priority tasks, and
the general-purpose processing units in the low-priority domain are assigned to perform one or more low-priority tasks;
during runtime of the processing system, obtaining memory usage measurements that characterize usage of system memory by the high-priority domain and the low-priority domain; and
adjusting, based on the memory usage measurements, a configuration of (i) the high-priority domain, (ii) the low-priority domain, or (iii) both to adjust utilization of the system memory by the general-purpose processing units.

26. The one or more computer storage media of claim 25, wherein the memory usage measurements comprise a measurement of system memory latency.

27. The one or more computer storage media of claim 26, wherein adjusting, based on the memory usage measurements, a configuration of (i) the high-priority domain, (ii)

the low-priority domain, or (iii) both to adjust utilization of the system memory by the general-purpose processing units comprises:
    reducing the number of active general purpose processors in the low-priority domain when the system latency is high.

28. The one or more computer storage media of claim 26, wherein adjusting, based on the memory usage measurements, a configuration of (i) the high-priority domain, (ii) the low-priority domain, or (iii) both to adjust utilization of the system memory by the general-purpose processing units comprises:
    increasing the number of active general purpose processors in the low-priority domain when the system memory bandwidth is low.

29. The one or more computer storage media of claim 25, wherein the memory usage measurements comprise a measurement of system memory saturation.

30. The one or more computer storage media of claim 29, wherein adjusting, based on the memory usage measurements, a configuration of (i) the high-priority domain, (ii) the low-priority domain, or (iii) both to adjust utilization of the system memory by the general-purpose processing units comprises:
    reducing the number of active general purpose processors in the low-priority domain when the system memory saturation is high.

* * * * *